Jan. 11, 1966  L. R. NEWTON  3,228,237
TEST FIXTURES FOR DETERMINING THE COMPRESSIVE OR TENSILE
STRENGTH OF VARIOUS RINGS

Filed April 8, 1963  2 Sheets-Sheet 1

INVENTOR.
LOWELL R. NEWTON

BY  *D. Hodges* ATTY.
 *L. S. Margolis* AGENT.

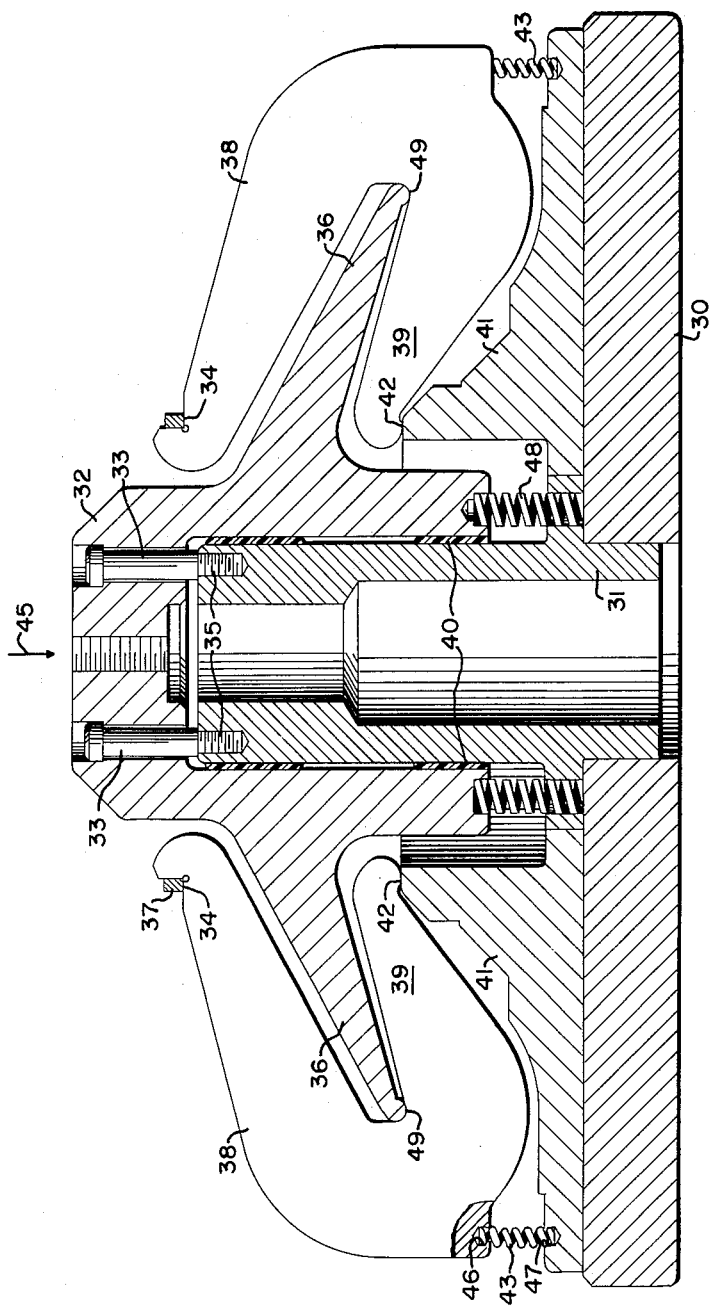

United States Patent Office 3,228,237
Patented Jan. 11, 1966

3,228,237
TEST FIXTURES FOR DETERMINING THE COMPRESSIVE OR TENSILE STRENGTH OF VARIOUS RINGS
Lowell R. Newton, Menomonee Falls, Wis., assignor, by mesne assignments, to the United States of America as represented by the Secretary of the Navy
Filed Apr. 8, 1963, Ser. No. 271,531
7 Claims. (Cl. 73—88)

The present invention relates to testing machines and more particularly to a test fixture for determining the compressive and tensile properties of filament-wound glass reinforced plastic rings or metal rings.

In the field of compression and tensile testing machines, it has been the general practice to employ a test fixture using a plurality of fluid operated plungers or a plurality of individually adjustable linkages to exert compressive loads on the test ring.

Other test fixtures utilize a torsional force in combination with a complicated force applying linkage to exert tensile forces on the test ring. Although such devices have served the purpose, they have not proved entirely satisfactory under all conditions of service for the reason that considerable difficulty has been experienced in compressing the ring at a uniform rate with uniform radial loads at all portions of the rings to which the loads are applied.

The general purpose of this invention is to provide a compression testing fixture and a tensile testing fixture which embrace all the advantages of similarly employed devices and possess none of the aforedescribed disadvantages. To attain this, the present invention contemplates a unique test fixture in which the test ring is kept circular at all times, and the compressive or tensile force, as the case may be, is exerted upon the circumference of the test ring equally and simultaneously by each of the seventy-two rigid steel rocker arms. A central axial load applied at one point initiates movement of the rocker arms. The test fixture minimizes friction variables thereby allowing precise measurement of the stress and strain of the test ring.

An object of the present invention is the provision of test fixtures for determining the compressive or tensile properties of various test rings.

Another object is to provide a test fixture in which a single axial load applies a uniform load at a plurality of points on the ring at a uniform rate of compression or tension.

A still further object is the provision of test fixtures that either compress or exert a tensile force on a test ring at a plurality of points equally and simultaneously by means of a plurality of rocker arms.

With these and other objects in view, as will hereinafter more fully appear, and which will be more particularly pointed out in the appended claims, reference is now made to the following description taken in connection with the accompanying drawings in which:

FIG. 3 shows a cross-sectional view of another embodiment of the test fixture.

Figure 1:
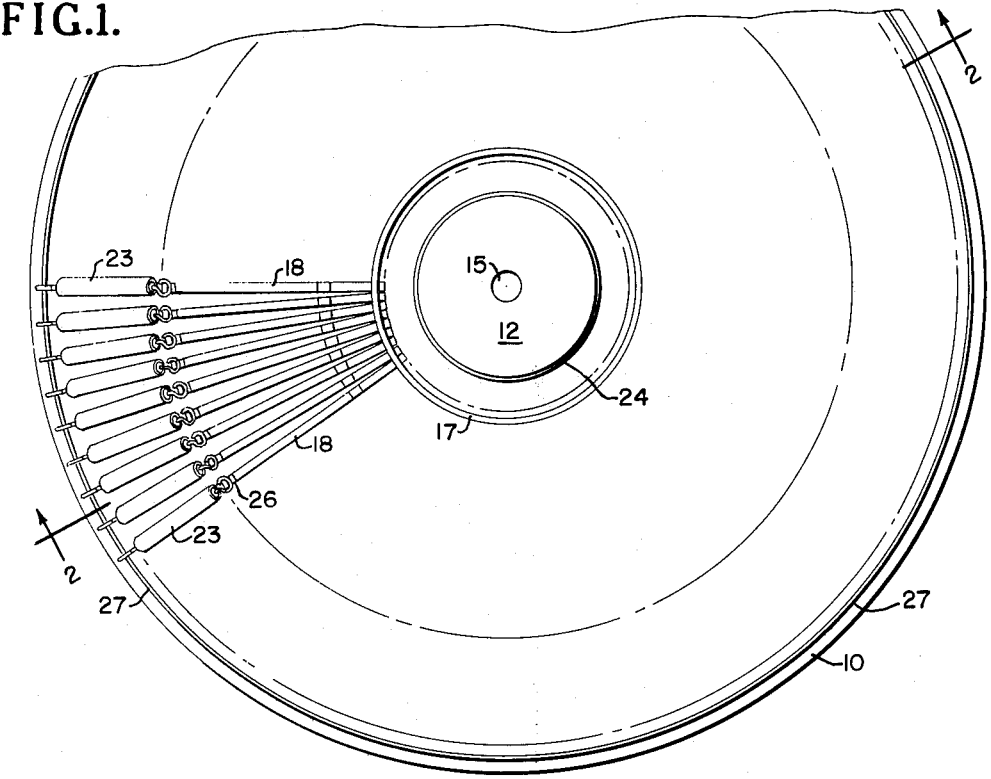
FIG. 1 shows a plan view of a preferred embodiment of the invention.
Figure 2:
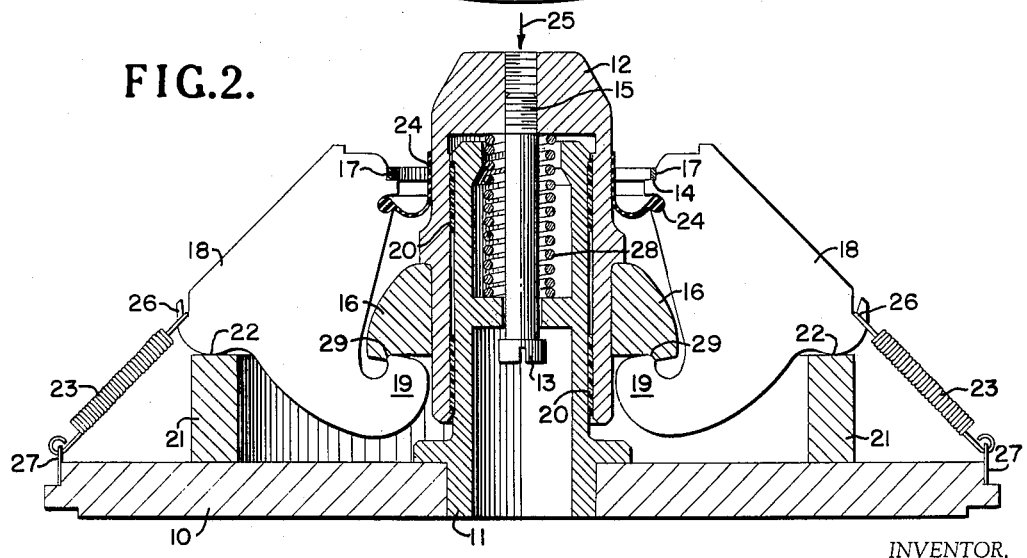
FIG. 2 shows a cross-sectional view of the test fixture taken on line 2—2 of FIG. 1 looking in the direction of the arrows.

Referring now to the drawings, wherein like reference characters designate like or corresponding parts throughout the several views, there is shown in FIG. 1 and FIG. 2 a test fixture for testing the compressive strength of a filament-wound, glass reinforced plastic ring, metal ring or test ring 17 made of a desired material. A guide post 11 is inserted in a circular base plate 10 and attached by suitable means. Annular fulcrum ring 21 is also mounted on base plate 10. Plunger 12 is slidable on guide post 11 on nylon bearings 20. Bolt 13 is threadably connected to plunger 12 at 15 and movably secures plunger 12 to guide post 11. Spring 28 biases plunger 12 against the load 25 and returns the plunger to its initial position after the load is removed. Seventy-two rocker arms 18 are rockably mounted on fulcrum ring 21 at surface 22. Fingers 19 of rocker arms 18 are in contact with the annular collar 16 of plunger 12 at 29. Return springs 23 are attached to the rocker arms 18 at 26 and to the outer circumference of the base plate 10 at 27. Dust cover 24 is placed around the plunger 12 and engages rocker arms 18. Test ring 17 is placed on seats 14 of the rocker arms 18.

The compression testing fixture operates in the following manner. An axial load 25 is applied to plunger 12 thereby forcing the plunger vertically downward. The collar 16, which is secured to plunger 12, forces fingers 19 of rocker arms 18 to move inwardly about surface 22 whereby the rocker arms compress test ring 17 radially at seventy-two different points at a uniform rate with uniform loads. After the load is released, return springs 23 and axial spring 28 restore the rocker arms and plunger to their initial unloaded position.

The test fixture is used in a standard compression testing machine, which exerts the load on the test fixture. By measuring and recording the load applied to the plunger and the movement of the plunger, the stress and strain of the test ring can be ascertained, and thus the compressive strength and the compressive modulus can be determined. The number of rocker arms can be varied depending upon the desired number of loading points.

FIG. 3 shows a modification of the test fixture in which the fixture is used for determining the tensile strength of test rings made from desired materials. Guide post 31 is inserted into circular base plate 30 and attached by suitable means. Annular jaw ring 41 is also mounted on base plate 30. Plunger 32 is slidable on guide post 31 on nylon bearings 40. Bolts are threadably connected at 35 to guide post 31 and movably secure plunger 32 thereto. Springs 48 bias plunger 32 against the applied load. Seventy-two rocker arms 38 are rockably mounted on fulcrum ring 41 at surface 42. Fingers 39 of rocker arms 38 are in contact with the annular collar portion 36 of plunger 32 at 49. Return springs 43 are inserted in grooves 46 of rocker arms 38 and grooves 47 of fulcrum ring 41. Test ring 37 is placed on the seats 34 of the rocker arms 38.

The tensile testing fixture operates in the following manner. An axial load 45 is applied to plunger 32 thereby forcing the plunger vertically downward. The collar portion 36 of plunger 32 acts through surface 49 to move the rocker arms outwardly about surface 42 of fulcrum ring 41 whereby the rocker arms exert uniform radial tensile loads at a uniform rate at seventy-two different points on the test ring. After the load is released, return springs 43 and springs 48 restore the rocker arms and plunger to their original unloaded position. Of course, the tensile test fixture is used in the same manner as the compression test fixture to determine the stress, strain, compressive strength and compressive modulus of the test ring.

Thus, a test fixture has been provided for determining the compressive or tensile properties of various test rings.

Also, a test fixture has been provided whereby a single axial load applies uniform loading at a plurality of points on a test ring at a uniform rate of compression or tension. Further, a test fixture has been provided whereby compressive or tensile forces are exerted on a test ring

What is claimed is:

1. A test fixture for determining the strength of various test rings,
   a base plate,
   an annular fulcrum ring concentric with and secured to the base plate,
   a guide post insertable in the center of said annular ring and perpendicular to said base plate,
   a plunger having an annular collar slidable on said guide post,
   a plurality of rocker arms rockably mounted on a surface of the fulcrum ring and a finger portion of each rocker arm in contact with said annular collar, each of said rocker arms being provided with notches to define seats for supporting a test ring and having at least one surface parallel to said plunger,
   an axial load applied to said plunger moving said plunger on said guide post toward said base plate whereby the annular collar moves the finger portions of the rocker arms about the fulcrum ring surface thereby simultaneously loading the test ring radially with equal forces at a plurality of points at a uniform rate.

2. A test fixture as set forth in claim 1 where the rocker arms are moved outwardly with respect to the axis of symmetry of the test fixture thereby exerting radial tensile forces on said test ring.

3. A test fixture as set forth in claim 1 where the rocker arms are moved inwardly with respect to the axis of symmetry of the test fixture thereby exerting radial compressive forces on said test ring.

4. A test fixture as set forth in claim 1 where spring means restore the plunger and rocker arms to their initial unloaded position.

5. A test fixture as set forth in claim 1 including bolt means to movably secure the plunger to the guide post.

6. A test fixture as set forth in claim 1 including nylon bearings located between the plunger and guide post.

7. In a test fixture for determining the strength of various test rings,
   a base plate means comprising a circular base plate with an annular fulcrum ring mounted thereon,
   a guide post insertable in the base plate means and perpendicular thereto,
   plunger means slidable on said guide post,
   a plurality of rocker arms rockably mounted on a surface of the base plate means and having first adjacent ends in operating contact with said plunger means,
   the other ends of said rocker arms being provided with notches to define seats for supporting a test ring and having at least one surface parallel to said plunger,
   an axial load exerted upon said plunger means moving said plunger means toward said base plate means thereby moving said rocker arms about said surface whereby equal radial loading forces are exerted on said test ring simultaneously at a uniform rate.

References Cited by the Examiner

UNITED STATES PATENTS

| | | | |
|---|---|---|---|
| 668,928 | 2/1901 | Parsons. | |
| 1,416,694 | 5/1922 | De Leeuw | 33—178 |
| 1,926,725 | 9/1933 | Johnson | 279—108 |
| 2,291,561 | 7/1942 | Reiss | 73—161 |
| 2,436,526 | 2/1948 | Olson | 279—2 |
| 2,853,876 | 9/1958 | Majkrzak | 73—161 |

RICHARD C. QUEISSER, *Primary Examiner.*

JOSEPH P. STRIZAK, *Examiner.*

E. P. FORGRAVE, G. M. GRON, *Assistant Examiners.*